(12) United States Patent
Krishnaswamy et al.

(10) Patent No.: US 8,879,835 B2
(45) Date of Patent: Nov. 4, 2014

(54) FAST ADAPTIVE EDGE-AWARE MATTING

(75) Inventors: Aravind Krishnaswamy, San Jose, CA (US); Michael W. Tao, Fremont, CA (US)

(73) Assignee: Adobe Systems Incorporated, San Jose, CA (US)

(*) Notice: Subject to any disclaimer, the term of this patent is extended or adjusted under 35 U.S.C. 154(b) by 275 days.

(21) Appl. No.: 13/482,767

(22) Filed: May 29, 2012

(65) Prior Publication Data

US 2013/0051663 A1 Feb. 28, 2013

Related U.S. Application Data

(60) Provisional application No. 61/527,984, filed on Aug. 26, 2011.

(51) Int. Cl.
| | | |
|---|---|---|
| G06K 9/34 | (2006.01) | |
| H04N 1/60 | (2006.01) | |
| G06T 7/00 | (2006.01) | |
| H04N 1/409 | (2006.01) | |
| G06K 9/00 | (2006.01) | |

(52) U.S. Cl.
CPC .... *H04N 1/6047* (2013.01); *G06T 2207/10024* (2013.01); *G06T 2207/20152* (2013.01); *G06T 7/0091* (2013.01); *G06T 2207/20104* (2013.01); *G06T 7/0081* (2013.01); *H04N 1/4092* (2013.01); *G06K 9/00* (2013.01)
USPC ............ 382/164; 382/264; 382/162; 382/274

(58) Field of Classification Search
CPC ................ G06T 7/0081; G06T 7/0091; G06T 2207/10024; G06T 2207/20104; G06T 2207/20152; H04N 1/4092; H04N 1/6047; G06K 9/00
USPC ......... 382/164, 264, 115, 124, 125, 155, 162, 382/190, 154, 275, 274; 345/420, 589, 88
See application file for complete search history.

(56) References Cited

U.S. PATENT DOCUMENTS

| | | | | |
|---|---|---|---|---|
| 7,587,099 | B2* | 9/2009 | Szeliski et al. | 382/275 |
| 8,325,993 | B2* | 12/2012 | Dinerstein et al. | 382/115 |
| 2003/0095140 | A1* | 5/2003 | Keaton et al. | 345/700 |
| 2006/0221030 | A1* | 10/2006 | Shih et al. | 345/88 |
| 2007/0177817 | A1* | 8/2007 | Szeliski et al. | 382/275 |
| 2008/0075360 | A1* | 3/2008 | Li et al. | 382/155 |

(Continued)

OTHER PUBLICATIONS

Michael W. Tao and Aravind Krishnaswamyy, "Fast Adaptive Edge-Aware Mask Generation", ACM May 20-30, 2012, pp. 77-83.*

(Continued)

*Primary Examiner* — Mekonen Bekele
(74) *Attorney, Agent, or Firm* — Wolfe-SBMC

(57) ABSTRACT

Methods, apparatus, and computer-readable storage media for fast adaptive edge-aware matting in which a matting technique adaptively feathers selections, provides smooth color correspondence matting, and performs well in textured regions. The matting technique may require fewer strokes and less parameter tuning than conventional matting techniques. The matting technique may have two components implemented in a matting pipeline. A color similarity component implements a color similarity constraint technique based on a radial basis function (RBF) technique to generate a color-constrained mask, and a locality constraint component implements a locality constraint technique based on a fast flood fill technique to generate a locality-constrained mask. The final mask (or matte) output may be an element multiply of the masks generated by the two components.

20 Claims, 14 Drawing Sheets

(56) References Cited

U.S. PATENT DOCUMENTS

| | | | |
|---|---|---|---|
| 2009/0034868 A1* | 2/2009 | Rempel et al. | 382/264 |
| 2010/0040304 A1* | 2/2010 | Okutomi et al. | 382/264 |
| 2010/0118045 A1* | 5/2010 | Brown et al. | 345/589 |
| 2011/0047163 A1* | 2/2011 | Chechik et al. | 707/741 |
| 2011/0267344 A1* | 11/2011 | Germann et al. | 345/420 |

OTHER PUBLICATIONS

Zeev Farbman et al., "Diffusion Maps for Edge-Aware Image Editing", SIGGRAPH Asia 2010. pp. 12, 2010.*
Criminisi, A., Sharp, T., Rother, C., and Perez, P. 2010. Geodesic image and video editing. ACM Transactions on Graphics, 29, 5, 134. pp. 1-15.
Li, Y., Ju, T., and Hu, S. 2010. Instant propagation of sparse edits on images and videos. Computer Graphics Forum. pp. 1-6.
An, X., and Pellacini, F. 2008. AppProp: all-pairs appearance-space edit propagation. ACM SIGGRAPH. pp. 1-9.
Arbelaez, P., Maire, M., Fowlkes, C., and Malik, J. 2011. Contour detection and hierarchical image segmentation. IEEE PAMI. pp. 1-20.
Bai, X., and Sapiro, G. 2011. A geodesic framework for fast interactive image and video segmentation and matting. IEEE ICCV. pp. 1-8.
Bousseau, A., Paris, S., and Durand, F. 2009. User-assisted intrinsic images. pp. 1-10 ACM SIGGRAPH Asia.
Bychkovsky, V., Paris, S., Chan, E., and Durand, F. 2011. Learning photographic global tonal adjustments with a database of input/output image pairs. IEEE CVPR. pp. 1-8.
Farbman, Z., Fattal, R., and Lischinski, D. 2010. Diffusion maps for edge-aware image editing. ACM Transactions on Graphics. pages 1-10.
Hertzmann, A., Jacobs, C., Oliver, N., Curless, B., and Salesin, D. 2001. Image analogies. ACM SIGGRAPH. pp. 1-14.
Igarashi, M., Ikebe, M., Shimoyama, S., Yamano, K., and Motohisa, J. 2010. O(1) bilateral filtering with low memory usage. IEEE Image Processing. pp. 1-6.
Li, Y., Adelson, E., and Agarwala, A. 2008. Scribbleboost: adding classification to edge-aware interpolation of local image and video adjustments. Computer Graphics Forum. pp. 1-10.
Lischinski, D., Farbman, Z., Uyttendaele, M., and Szeliski, R. 2006. Interactive local manipulation of tonal values. ACM Transactions on Graphics. pp. 1-8.
Liu, J., Sun, J., and Shum, H. 2009. Paint selection. ACM SIGGRAPH. pp. 1-7.
MacQueen, J. 1967. Some methods for classification and analysis of multivariate observations. Berkeley Symposium of Mathematical Statistics and Probability. pp. 1-17.
Paris, S., Hasinoff, S., and Kautz, J. 2011. Local Laplacian filters: edge-aware image processing with a laplacian pyramid. ACM Transactions on Graphics. pp. 1-11.
Rav-Acha, A., and Peleg, S. 2005. Two motion blurred images are better than one. IAPR Pattern Recognition Letters. pp. 1-7.
Sun, J., Sun, J., Xu, Z., and Shum, H. 2008. Image superresolution using gradient profile prior. IEEE CVPR. pp. 1-8.
Sundberg, P., Malik, J., Maire, M., Arbelaez, P., and Brox, T. 2011. Occlusion boundary detection and figure/ground assignment from optical flow. IEEE CVPR. pp. 1-8.
Tao, M., Johnson, M., and Paris, S. 2010. Error-tolerant image compositing. IEEE ECCV. pp. 1-14.
Tomasi, C., and Manduchi, R. 1998. Bilateral filtering for gray and color images. IEEE ICCV. pp. 1-8.
Wang, J., Agrawala, M., and Cohen, M. 2007. Soft scissors: an interactive tool for realtime high quality matting. ACM Transactions on Graphics. pp. 1-11.
Wang, B., Yu, Y., and Xu, Y. 2011. Example-based image color and tone style enhancement. ACM Transactions on Graphics. pp. 1-6.

* cited by examiner

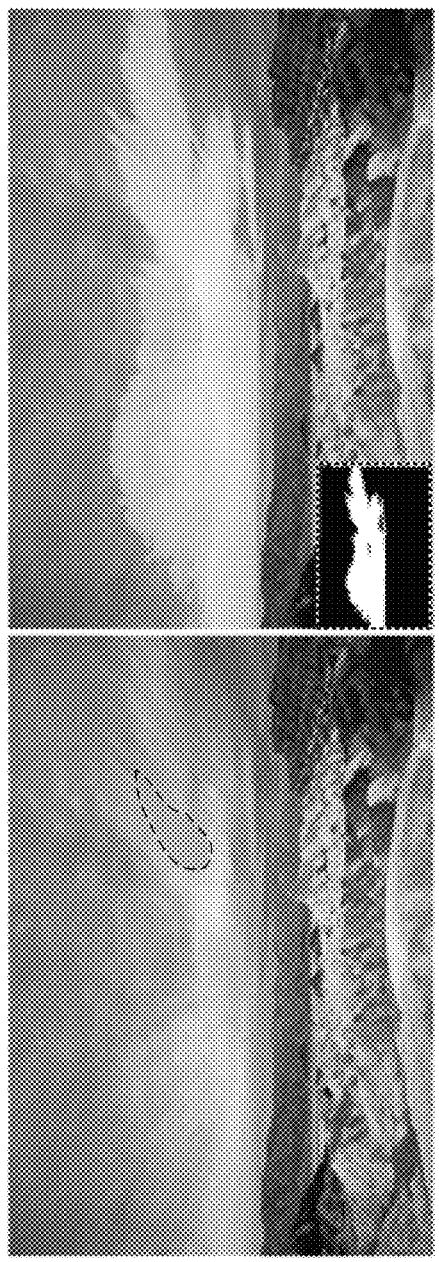
FIG. 1A
FIG. 1B
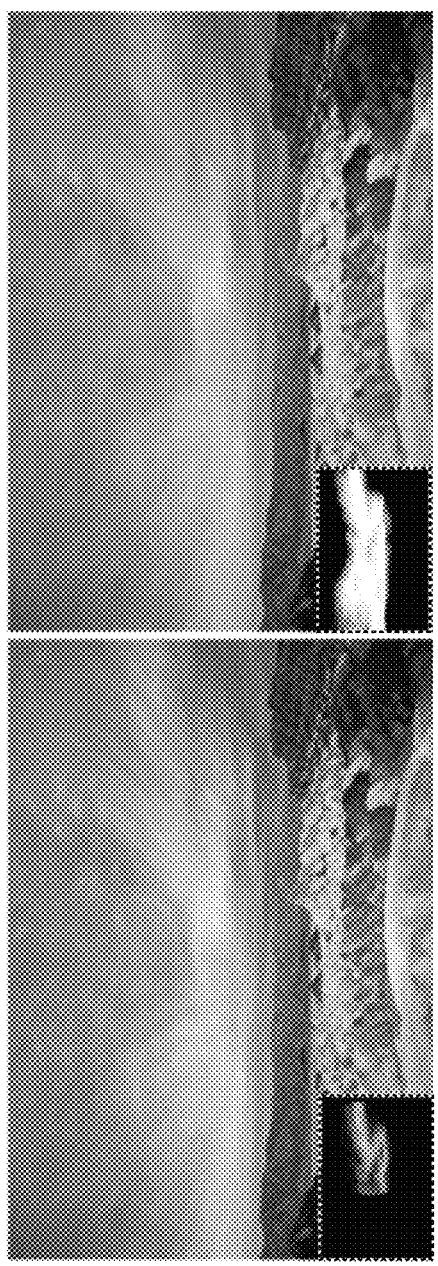
FIG. 1C
FIG. 1D

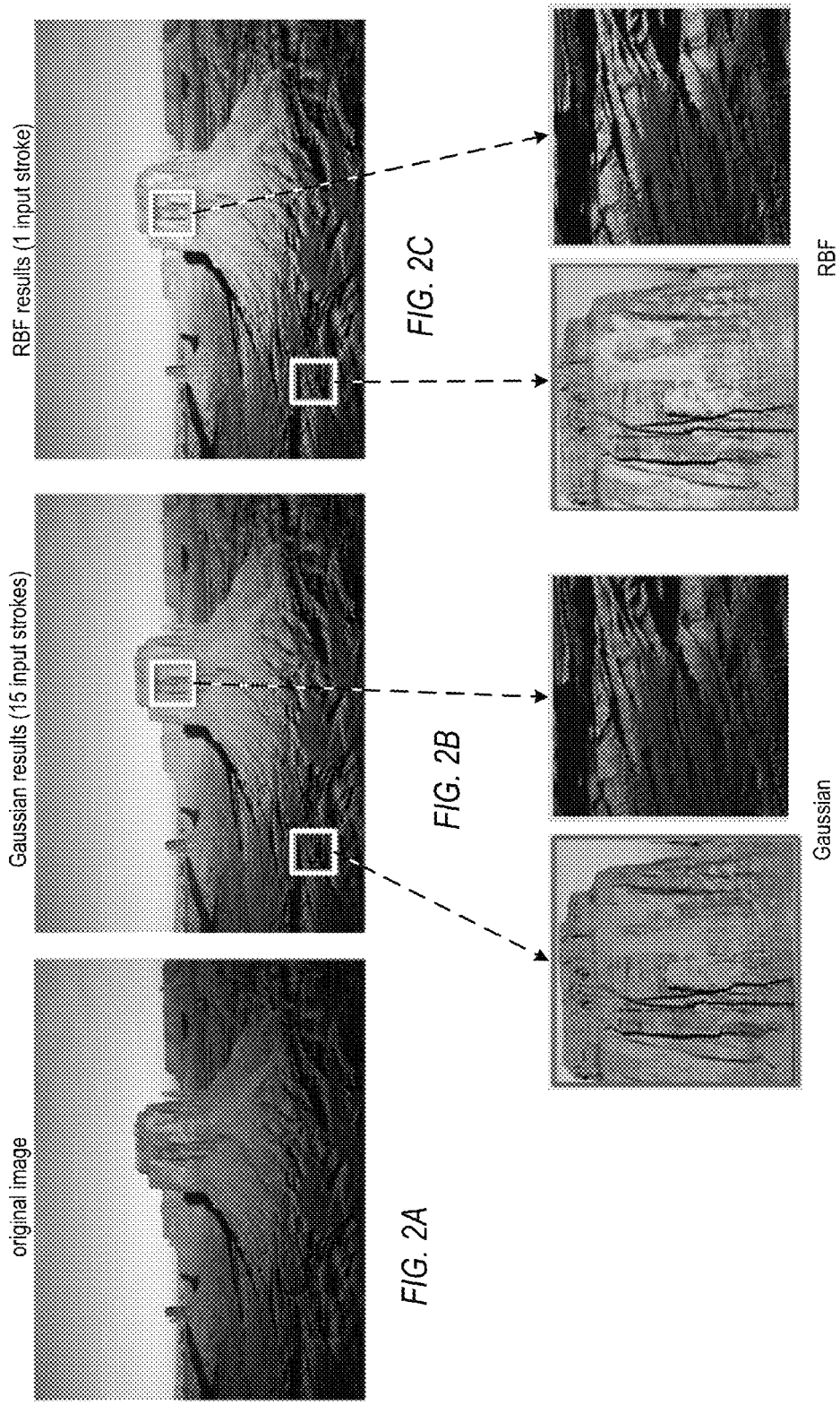

FAST ADAPTIVE EDGE-AWARE MATTING

PRIORITY INFORMATION

This application claims benefit of priority of U.S. Provisional Application Ser. No. 61/527,984 entitled "FAST ADAPTIVE EDGE-AWARE MATTING," filed Aug. 26, 2011, the content of which is incorporated by reference herein in its entirety.

BACKGROUND

Description of the Related Art

Matting techniques are useful in many image editing and image processing techniques, including but not limited to re-coloring, image segmentation, and video modification techniques. For example, it is common in image editing for users to localize their edits such as color modification and tonal management when doing digital artwork, as global edits offer less control and may cause undesirable effects in certain regions. Matting, which is generally used as an alpha channel to blend the original and desired image edits, may be used to assist users in making the localized edits.

Components of image matting may include finding color and local (spatial) correspondence. Conventional matting techniques generally use coefficient fall-offs such as Gaussians to compute both correspondences. However, Gaussian fall-offs require a matting technique to choose a specific comparison color to calculate the coefficients of surrounding pixels and spatial sigmas for both color and spatial constraints. To extract one comparison color, conventional matting techniques typically use the mean of pixel values inside the user-selection. Because of the averaging, the use of one specific color may require adjustments in tolerance and many strokes to complete the selection. Spatial and color tolerances require the users to adjust these parameters to achieve desired effects. Thus, conventional matting techniques generally require parameter tuning and additional strokes to achieve adequate results.

SUMMARY

Various embodiments of methods, apparatus, and computer-readable storage media for fast adaptive edge-aware matting are described. Embodiments of a matting technique are described that adaptively feather selections, provide smooth color correspondence matting, and perform well in textured regions. Embodiments of the matting technique may require fewer strokes and less parameter tuning from users than conventional matting techniques. At least some embodiments of the matting technique may have two stages, tracks, or components that may be performed serially or in parallel. One component applies a color similarity constraint based on an importance sampling technique and a radial basis function (RBF) technique to generate a color-constrained mask, and the other component applies a locality constraint according to a texture analysis technique to generate a locality-constrained mask. The texture analysis technique may be based on a fast flood fill technique and a frequency analysis technique. Results of the color constraint component and the locality constraint component may be combined to produce an output mask or matte for an image that is smooth in low-frequency regions of the image while preserving edges in high-frequency regions of the image.

In at least some embodiments, there are two inputs to the matting pipeline: an original image and a selected region, which may for example be specified by a user using one or more brush strokes or by other selection techniques. From the input (the image and the selected region), the matting technique, in a color constraint portion, calculates a mask according to a color similarity constraint technique (referred to as a color-constrained mask). In a locality constraint portion, the matting technique calculates a mask according to a locality constraint technique (referred to as a locality-constrained mask). The two masks may then be combined, for example using an element multiply, to generate an output mask for the entire image according to the selected region.

In at least some embodiments, in the color constraint component, the K-means is computed as input for an importance sampling technique. The importance sampling technique determines best locations from which sample colors are to be selected. The samples output by the importance sampling technique are then used to construct a radial basis function (RBF) that is used to compute a color similarity mask (referred to as a color-constrained mask) for all pixels as output of this component.

In at least some embodiments, in the texture analysis performed by the locality constraint component, the matting technique reduces the impact of textured regions by applying an edge-preserving filter to the input image, for example a bilateral filter, and uses the hue channel output for the remaining steps. A flood fill algorithm is applied to the filtered hue channel, which produces an initial locality mask. In at least some embodiments, because of its binary nature, in mask edges that correspond to low frequency regions of the original image a Gaussian kernel may be applied to smooth the fall-off and thus reduce undesirable hard edges. In at least some embodiments, low-frequency regions of the image may be identified according to a gradient domain technique, a blur mask indicating blur regions corresponding to the low-frequency regions may be generated, and this blur mask may be blended with output of the flood fill technique (the initial locality mask) to generate the final locality-constrained mask.

In at least some embodiments, the final output mask of the matting technique may be a blending (e.g., an element multiply) of the masks generated by the two components. The final output mask may be smooth in low-frequency regions of the image while preserving edges in high-frequency regions of the image.

BRIEF DESCRIPTION OF THE DRAWINGS

FIGS. 1A through 1D illustrate an example of selective desaturation, and compares results of embodiments of the matting technique described herein to conventional matting techniques.

FIGS. 2A through 2C show a desaturation example that compares Gaussian methods as used in conventional techniques to radial basis functions (RBF) as used in embodiments.

FIGS. 11A and 11B illustrate inaccurate selections in regions where colors are very similar.

Figure 3:
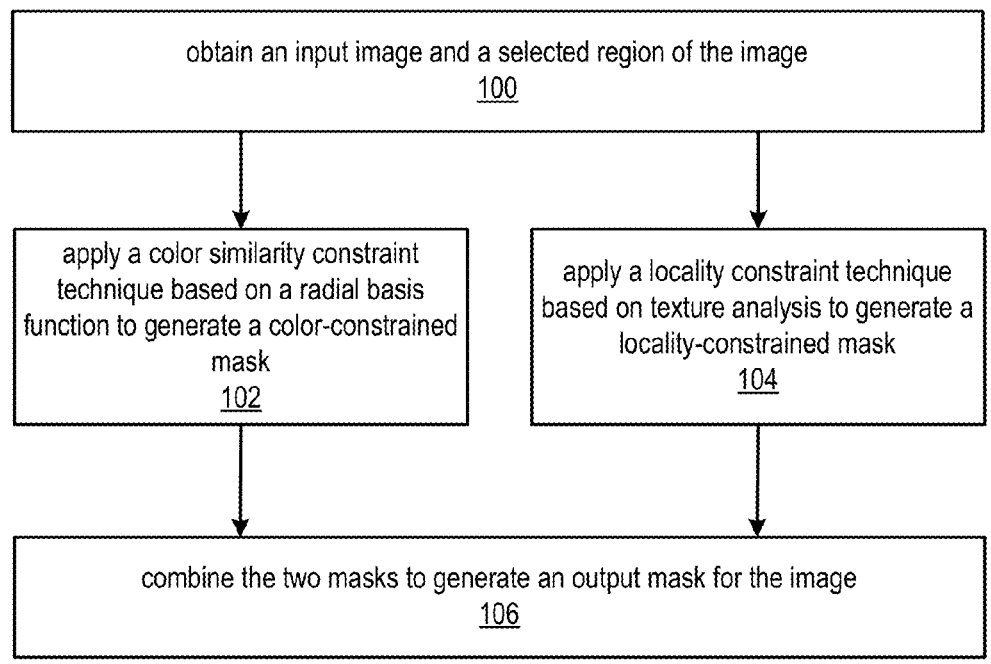
FIG. 3 is a high-level flowchart of a fast adaptive edge-aware matting technique, according to at least some embodiments.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Various embodiments of methods, apparatus, and computer-readable storage media for fast adaptive edge-aware matting are described. Selective editing, also known as matting, is a technique that may be used, for example, to create localized effects, such as saturation and tonal management, in images. However, conventional matting techniques typically require parameter tuning or many strokes to achieve suitable results. Embodiments of a matting technique are described that adaptively feather selections, provide smooth color correspondence matting, and perform well in textured regions. Embodiments of the matting technique may require fewer strokes and less parameter tuning from users than conventional matting techniques. Embodiments of the matting technique may segment a selected region in an image and produce an adaptive feathered matte. In at least some embodiments, the matting technique extracts color similarities using radial basis functions, and segments the region the user selects to respect locality. Because of the linear complexity and simplicity in required user-input, embodiments of the matting technique described herein may be suitable for many image processing applications including applications on relatively low-powered devices such as mobile and touch-enabled devices (e.g., mobile phones, smartphones, tablet devices, pad devices, digital cameras, etc.), as well as for matting applications in digital image processing applications on more powerful devices such as laptop, notebook, and desktop computers.

Embodiments of the matting technique may require less if any parameter tuning, and may reduce the number of interactions (e.g., strokes) that the user must perform when making a selection when compared to conventional techniques. At least some embodiments may use radial basis functions (RBF), which account for all pixels within a stroke, thus reducing the number of user strokes required to obtain desirable results (see, e.g., FIGS. 2A through 2C), in a color constraint technique. For locality constraints, conventional matting techniques typically require changing of Gaussian locality sigmas to produce a smooth fall-off, and some use multiple strokes to produce similar constraints. Embodiments of the matting technique described herein may compute the locality term(s) using simple and efficient texture analysis. Embodiments of the matting technique described herein may thus be able to produce soft matting with local constraints. Using embodiments, achieving desirable outputs may require fewer user interactions (e.g., strokes) than conventional techniques. In addition, the framework of the matting technique has a linear complexity relative to the number of pixels in the image, and is thus more suitable for many graphics and editing applications that require real-time feedback, as well as more suitable for lower-powered devices such as pad or tablet devices, than are conventional, more complex matting techniques.

Aspects of the matting technique described herein may include, but are not limited to:

A texture reduction technique for segmentation. Embodiments may provide an intuitive texture analysis method for segmentation that reduces the impact of texture for flood fill algorithms. The method analyses texture to produce desirable smooth results without selection halos.

Fast adaptive feathering. Embodiments may provide a fast adaptive feathering method that removes hard seams in low-textured regions while maintaining sharp-edges in textured areas.

Radial basis function with importance sampling. Embodiments may leverage an importance sampling technique to improve the use of RBF in image editing tools.

Efficient framework. Embodiments of the described methods and techniques may be combined in an efficient linear complexity framework that may enable or improve interactive color editing on relatively low-powered devices such as mobile and touch-enabled devices (e.g., tablets, pads, smartphones, etc.).

The following is a discussion of some conventional image editing methods and techniques, with some comparisons to embodiments of the matting technique as described herein.

Gaussian correspondence techniques are commonly used in conventional image editing tools. The techniques are adapted from the edge preserving filters such as the bilateral filter. In the technique, a filter has two terms: spatial and color constraints. However, to calculate a Gaussian color constraint requires a single color target. To extract the target color, many of the conventional tools use an average of the selected pixels and compute the Gaussian coefficient for nearby pixels. Because textured regions consist of multiple colors, averaging user input stroke colors may reduce the effectiveness. The user may be required to make multiple strokes in textured regions to mask properly. Another solution to the problem is to increase the Gaussian color sigma, the tolerance of the color constraint; however, tweaking such parameters and changing brush properties require user intervention. See FIGS. 4A through 4C for an example of the ineffectiveness of Gaussian coefficients in textured regions.

Gradient and graph cut based techniques are commonly used for matting in conventional tools because of their ability to achieve relatively high quality results. However, because of the required linear solver and graph construction, these techniques are computationally expensive and typically require many user strokes in low frequency regions. A technique has been introduced that allows users to stroke at subject edges to produce relatively accurate matting. However, this technique requires the user to apply multiple strokes around the subject. Other techniques have used similar concepts but also require many user strokes to obtain desired results.

Conventional flood fill techniques may be very fast and scalable for many applications. However, due to the binary properties of flood fills, hard edges become very apparent and thus are not suitable for image edits where smooth fall-offs (feathering) are required. See FIG. 1B for an example of seams (hard edges) resulting from a conventional flood fill technique. In many cases, the user is required to adjust the tolerance parameter to achieve a desired selection. Moreover, conventional flood fill techniques may perform poorly in textured regions due to the limitation of expanding only using color tolerances.

Another conventional method uses constraint propagations such as radial basis functions in the spatial domain to obtain quality matting. However, due to its dense matrix calculations, this conventional method is computationally expensive and requires large memory bandwidth. A method has been introduced that uses diffusion maps to obtain relatively high quality results. However, due to the sampling requirements of the diffusion maps, to obtain quality results more samples are needed. This method scales unfavorably as the number of samples increase. An algorithm that propagates edits efficiently by using radial basis functions has also been introduced. However, this conventional algorithm presents instabilities in outputs when the user selects textured regions (see FIGS. 8A-8B).

Geodesic frameworks have shown desirable results at interactive times. However, these methods require a stroke within the background and a stroke within the foreground. Moreover, these frameworks are computationally expensive; to achieve the claimed performance, these methods rely heavily on relatively high-powered devices such as multicore devices. Furthermore, these methods may fail where colors are similar.

There are also conventional image analogy and global training techniques. Because of the globalized nature of these edits, they may be complementary to embodiments of the matting technique described herein as a user may blend results of these techniques with the original image using the matting technique described herein.

Embodiments of the matting technique as described herein may implement a flood fill technique in the locality constraint component that improves results when compared to conventional flood fill techniques. In addition, embodiments may implement a constraint propagation technique using RBF in the color constraint component that increases stability and reduces the number of samples needed to achieve consistent results when compared to conventional constraint propagation techniques.

FIGS. 1A through 1D illustrate an example of selective desaturation, and compare results of embodiments of the matting technique described herein to some conventional matting techniques. In FIG. 1A, a user applies a stroke on an original input image to select the region indicated by the dashed line. FIGS. 1B through 1D show results of various matting techniques, with the respective mattes shown in the lower left corners of the images as the content of the dotted rectangles. In FIG. 1B, a conventional flood fill matting technique produces results with hard edges. In FIG. 1C, a conventional color replacement technique produces visible brush stroke artifacts. Both of the techniques used in FIGS. 1B and 1C would require tuning parameters such as tolerance and brush sizes. In FIG. 1D, results of the matting technique described herein are illustrated. The resulting matte shows feathered fall-offs in the sky regions, and may only require one stroke from the user, without parameter tuning FIGS. 2A through 2C illustrate a desaturation example that compares Gaussian methods as used in conventional techniques to a radial basis function (RBF) technique as used in the color constraint component of the matting technique described herein, according to at least some embodiments. With a high textured region original image as shown in FIG. 2A, it can be seen that using a simple Gaussian fall-off causes misses in many colors, and would require many strokes from the user as shown in FIG. 2B. An RBF technique as described herein accounts for all colors within the stroke, therefore providing a more desirable result in textured areas and many fewer user strokes, as can be seen in FIG. 2C. The four images at the bottom are zoom-ins to the regions indicated by the white triangles in FIGS. 2B and 2C to compare results of the techniques in more detail. Also note that the Gaussian technique used to generate FIG. 2B required 15 user strokes, while the RBF technique of FIG. 2C required only one stroke to generate the results.

Matting Technique Embodiments

FIG. 3 is a high-level flowchart of the matting technique, according to at least some embodiments. At least some embodiments of the matting technique may have two stages or components. One component implements a color similarity constraint for the matting based on a radial basis function (RBF) technique to generate a color constraint mask, and the other component implements a locality constraint technique based on a fast flood fill technique to generate a locality constraint mask. The final mask (or matte) output may be an element multiply of the output masks from the two components.

Figure 12:
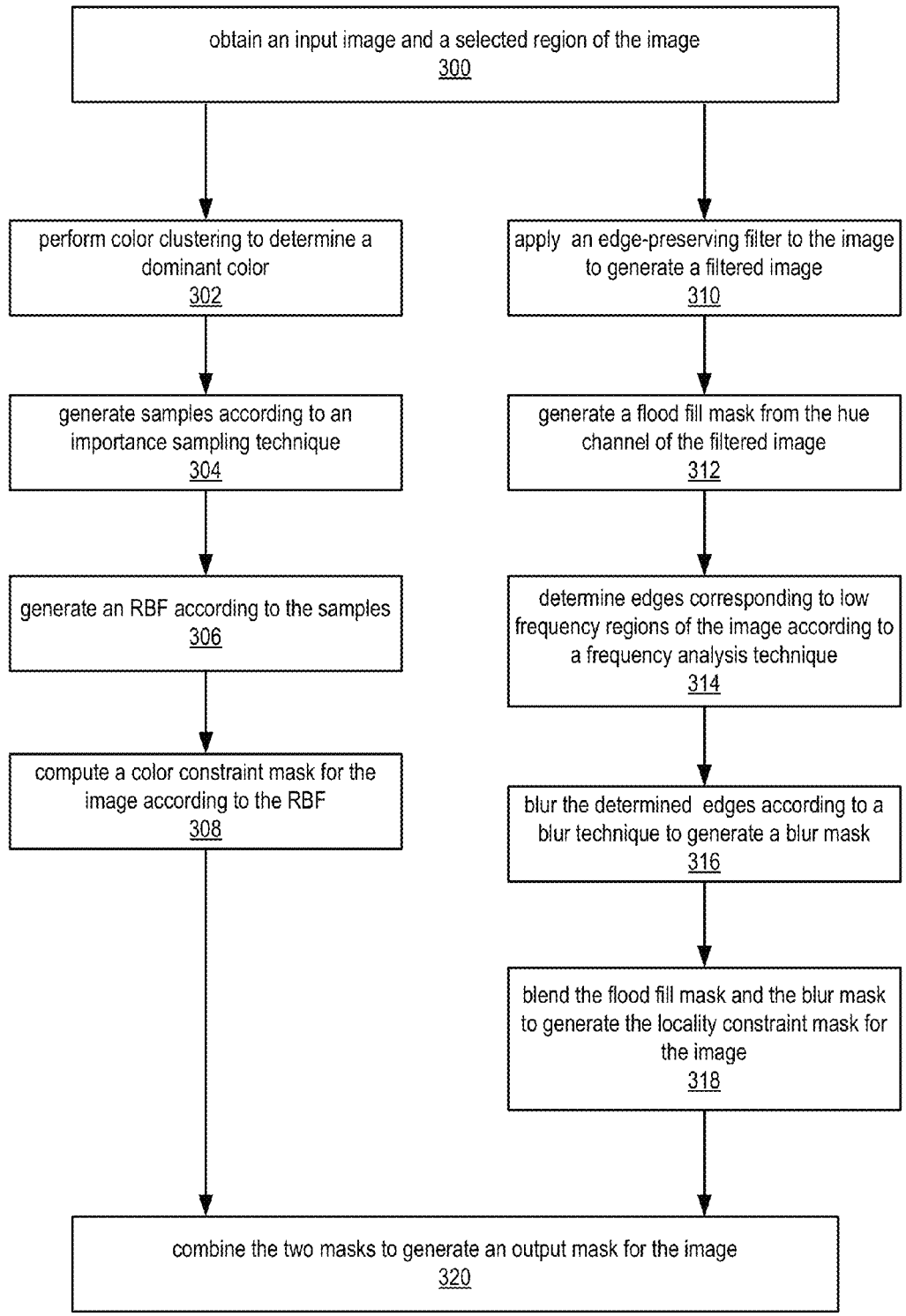
FIG. 12 is a more detailed flowchart of a fast adaptive edge-aware matting technique, according to at least some embodiments.

As indicated at 100, the method obtains an input image and a selected region as input. For example, a user action such as a stroke or strokes may specify the selected region. As indicated at 102, a color similarity constraint technique based on a radial basis function (RBF) may be applied to generate a color-constrained mask. The RBF is used to determine a color from the selected region to be used as the selection color in generating the mask, rather than using simple averaging to determine the selection color indicated by the selected region as in conventional techniques. In at least some embodiments, an importance sampling technique may be used to determine a set of samples used to generate the RBF, rather than using purely random samples as in conventional techniques. A color clustering technique such as K-means may be used to generate color clustering information used in the importance sampling, in at least some embodiments. As indicated at 104, a locality constraint technique based on a texture analysis of the image may be applied to generate a locality-constrained mask. The texture analysis produces smoothed selections in regions of the locality constraint mask corresponding to low frequency regions of the image while maintaining edges in regions of the locality constraint mask corresponding to high frequency regions of the image. As indicated at 106, the final mask (or matte) output may be generated by combining the output masks of 102 and 104. For example, an element multiply of the output masks of 102 and 104 may be performed to generate the output mask or matte. Note that other methods may be used to combine the two output masks in some embodiments. FIG. 12, described later in this document, provides a more detailed flowchart of the matting technique, according to at least some embodiments.

Figure 4:
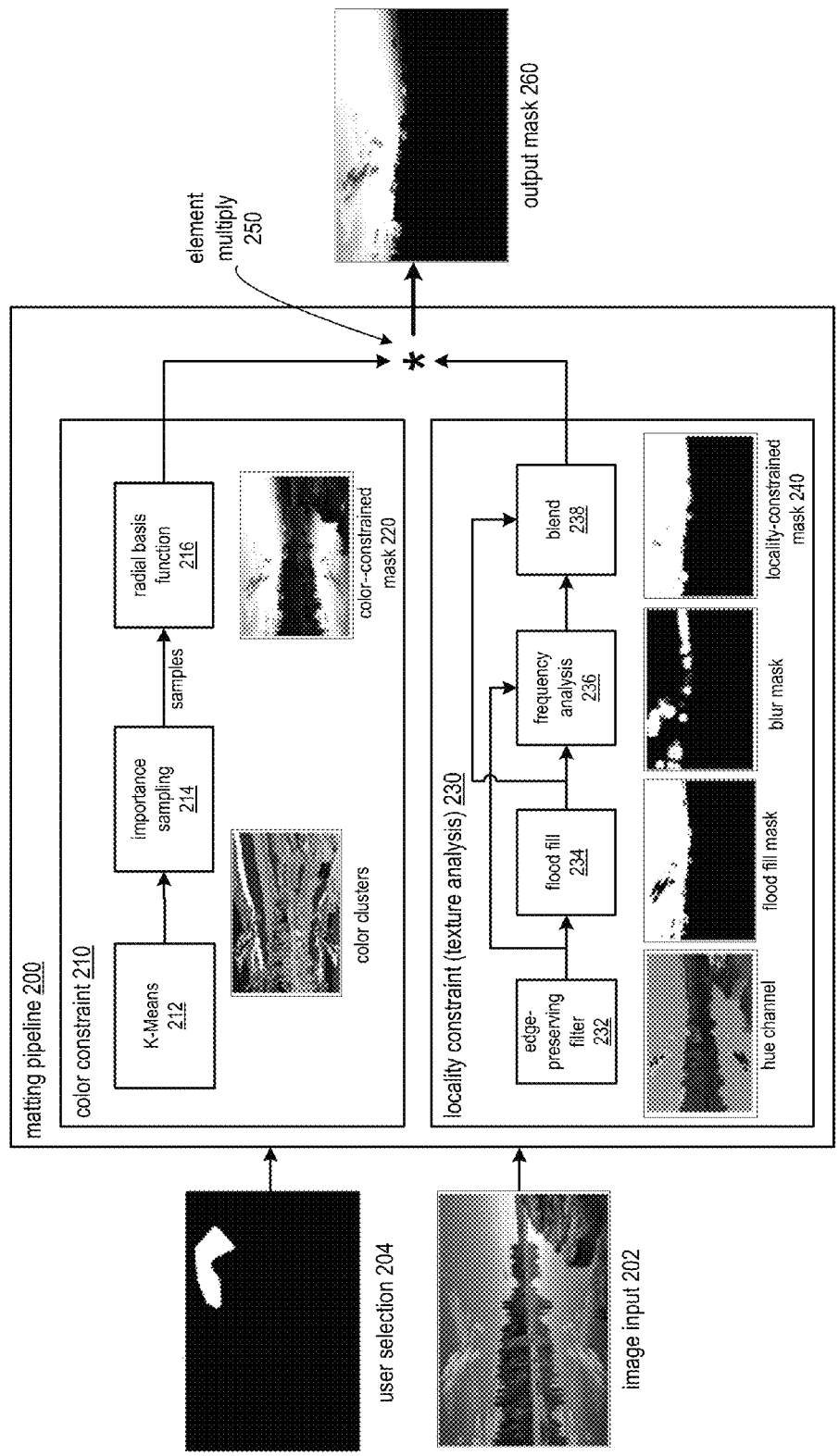
FIG. 4 illustrates an example matting pipeline, according to at least some embodiments.

FIG. 4 illustrates an example matting pipeline, according to at least some embodiments. In the matting pipeline 200 shown in FIG. 4, there are two inputs: the original image (image input 202) and a user selection 204. The user selection 204 indicates color(s) that the user wants to be used in generating a mask for the image. The matting pipeline 200 calculates a mask with color constraint (color-constrained mask 220) in the color constraint component 210, and a mask with locality constraint (locality-constrained mask 240) in the locality constraint component, from the input, and combines these two masks to generate an output mask 260.

In at least some embodiments, in the color constraint component 210, a color clustering technique, for example a K-means technique 212, may be used to compute color clustering information that indicates dominant colors in the user selection 204 and the entire image as input for an importance sampling method 214. K-means clustering is a cluster analysis method that partitions n elements into k clusters; each element is placed in the cluster with the nearest mean. The importance sampling technique 214 generates a set of samples for the radial basis function technique 216 according to the color clustering information. To generate the set of samples, the importance sampling technique 214 selects samples in the user selection 204 according to a weighting determined from the color clustering information so that more samples tend to be selected from regions of dominant colors than from other regions, rather than according to a purely random sampling method. The samples output by the importance sampling technique 214 are used in a radial basis function (RBF) technique 216 to generate the RBF from which a color similarity mask for all pixels (color-constrained mask 220) is computed based on color(s) in the user selection 204.

In at least some embodiments, in the locality constraint component 230, the matting technique reduces the impact of textured regions by using an edge-preserving filter 232, and uses the hue channel output for the remaining steps. The edge-preserving filter may be, but is not necessarily, a bilateral filter. A flood fill technique 234 is applied to the filtered hue channel, which produces an initial locality mask (flood fill mask). In at least some embodiments, because of its binary nature, in mask edges that correspond to low frequency regions of the original image, frequency analysis technique 236 may be applied to generate a blur mask. In at least some embodiments, the frequency analysis technique 236 may apply a Gaussian kernel to smooth the fall-off and thus reduce undesirable hard-edges. In at least some embodiments, the blur mask and the flood fill mask may be combined in a blend 238 operation, for example according to a MAX function that is applied to each pixel, to generate the locality-constrained mask 240.

After the color-constrained mask 220 and the locality-constrained mask are generated by the two components of the pipeline 200, the two masks may be combined to generate the output mask 260, for example according to an element multiply 250 operation.

At least some embodiments may use multiple color spaces, with a particular color space specified in each step of the pipeline. In at least some embodiments, all colors are represented in a floating point form, ranging from 0.0 to 1.0.

Note that the color constraint component 210 and the locality constraint component 230 may be performed serially, in either order, or may be performed in parallel. Further discussion of the various elements shown in FIGS. 3 and 4 is provided in the following sections.

Color Constraint with Importance Sampling

A goal of the color constraint component is to provide a smooth fall-out based on a color similarity metric between the user-selected pixels and every pixel in the image. Also, an overall goal is to reduce the number of strokes and parameter tuning required from the user when compared to conventional methods.

An advantage of using a radial basis function (RBF) for color selection is that using radial basis functions accounts for all the pixels within the user selection. To summarize, the method samples from the user-selected pixels as well as the other pixels within the image. With the samples, a linear solver may be used to compute the coefficients of the interpolation formulation. In at least some embodiments, the following formulation may be used:

$$M(X_i) = \sum_{j \in C} a_i \Phi(\|X_i - X_j\|) \quad (1)$$

$$\Phi(r) = \exp^{-\sigma * r^2} \quad (2)$$

where M is the RBF matte output, $X_i$ is the YCbCr vector at pixel i, C is the sampled YCbCr vector within the user selected region, and $\alpha_i$ are the coefficients that are solved from the linear solver. In some embodiments, $\sigma=42.5$ may be used because the value tends to work well on tested images; however, other values for $\sigma$ may be used.

The coefficients of the radial basis function represent the importance of a color being similar to a color within the set of selected colors. The radial basis function directly computes the value of the matte value. Pixels with values of 1.0 are most similar to the selected colors while pixels with values of 0.0 represent dissimilar colors.

Although the RBF technique does account for all pixels within the user selection, there may be disadvantages. For example, to construct the radial basis function, sampling plays a large role in determining the quality of the function. With too few samples, the RBF may behave inconsistently with the same selection (See FIGS. 5A-5C). To solve this problem, the number of samples may be increased to maintain consistent results. However, because of the linear solver and the computation of the RBF output of each pixel, each sample is very costly. As another example, since all pixels are randomly sampled in conventional RBF techniques, user selection mistakes and noise may affect the results.

Figure 5A:
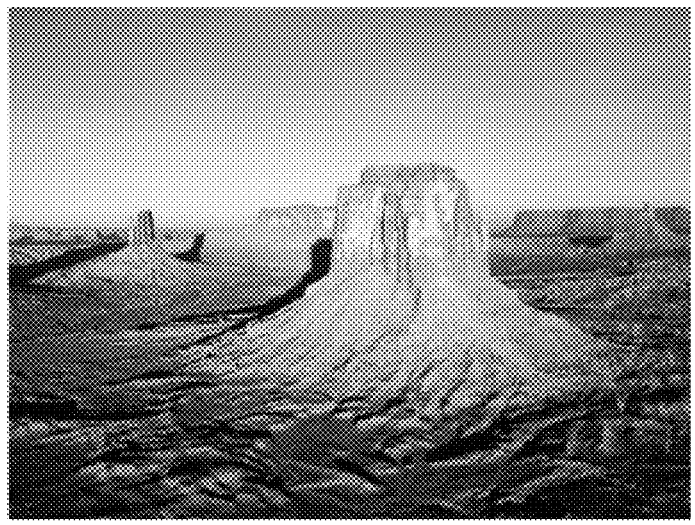
FIGS. 5A through 5C illustrate the effects of too few samples in the radial basis function.
Figure 5B:
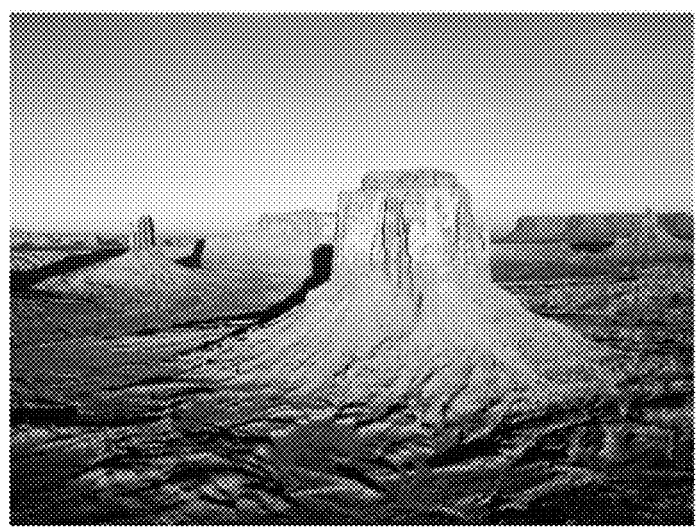
Figure 5C:
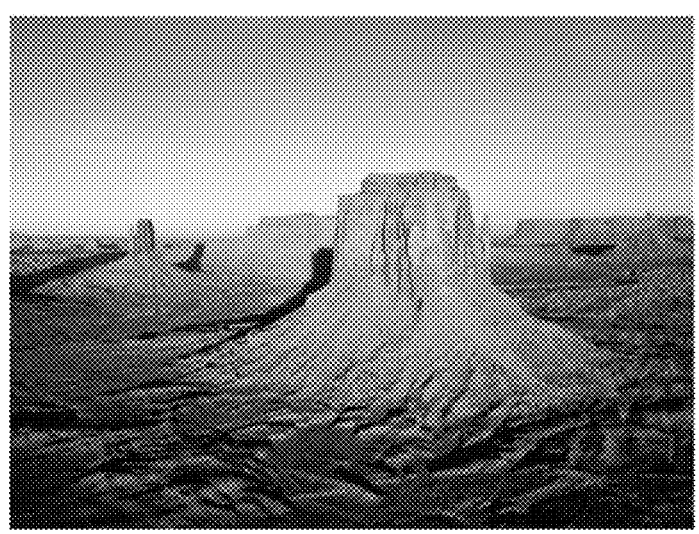

FIGS. 5A through 5C illustrate the effects of too few samples in the radial basis function. Performing the same desaturation operation as shown in FIGS. 2A-2C, using too few samples may result in inconsistent results. FIGS. 5A through 5C show three different iterations with the same user selection and image input. However, the output mask varies. Embodiments of the matting technique may use an importance sampling technique to generate samples to improve the consistency of the RBF technique, as shown in FIGS. 6A and 6B.

Figure 6A:
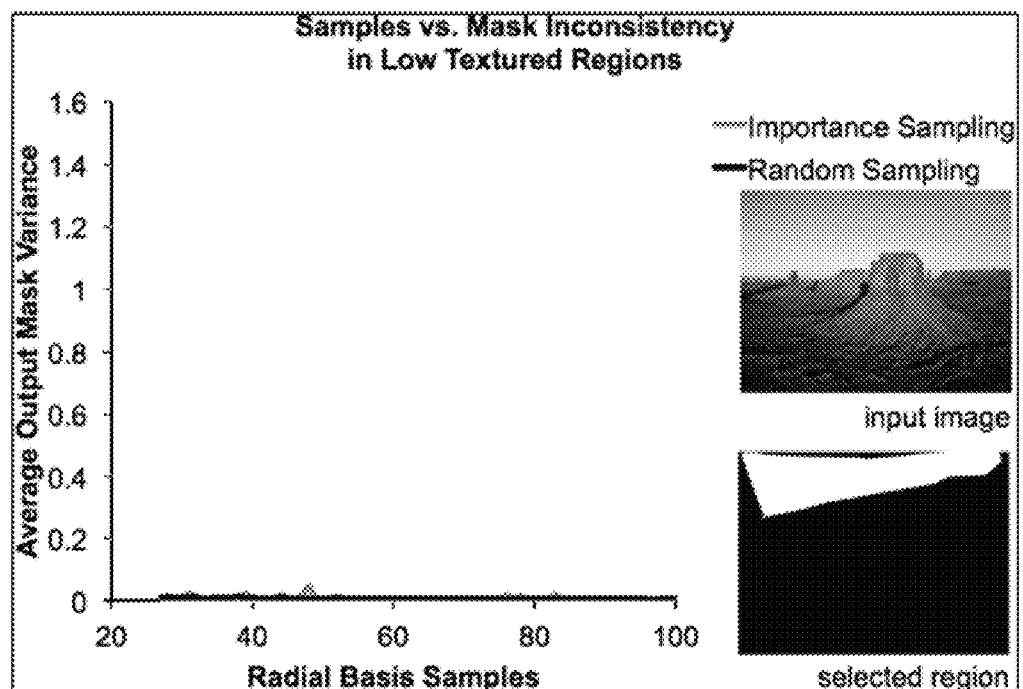
FIGS. 6A and 6B illustrate sampling convergence, and the difference between using importance sampling and random sampling to compute the radial basis function coefficients, according to at least some embodiments.
Figure 6B:
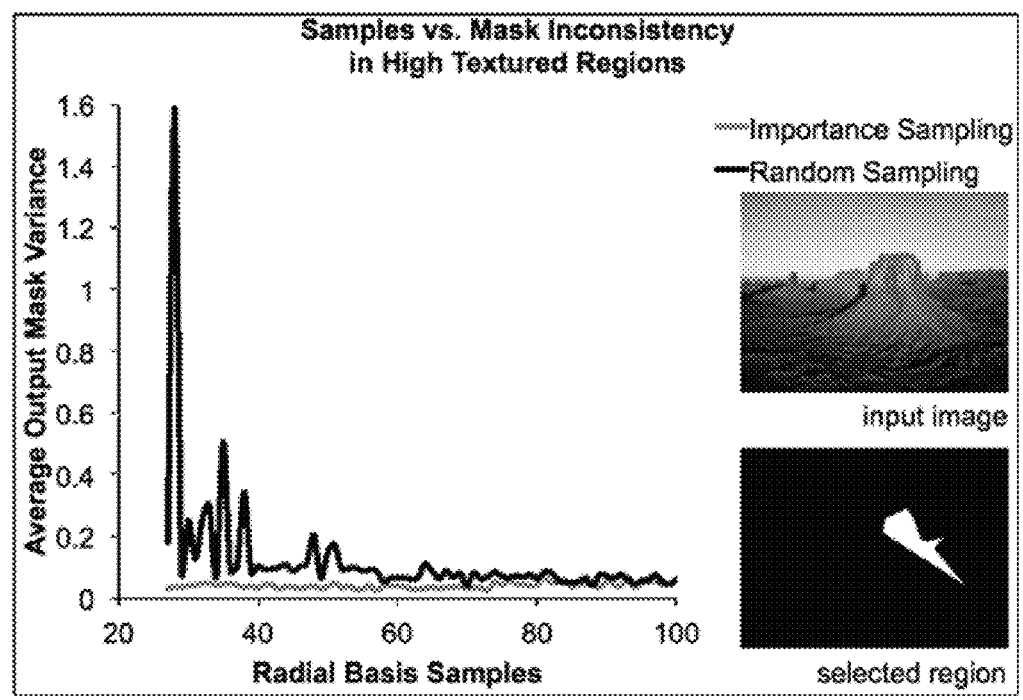

FIGS. 6A and 6B illustrate sampling convergence, and the difference between using importance sampling and random sampling to compute the radial basis function coefficients. To produce the results shown in FIGS. 6A and 6B, the number of samples are varied. For each number of samples, the operation is repeated ten times. The average pixel variance of the output of the ten iterations is measured. The lower the variance, the more consistent the result, which is favorable in image editing. On low frequency selections (FIG. 6A), the two methods show negligible differences. However, in high frequency selections, importance sampling shows more consistent results with fewer samples, as shown in FIG. 6B. High variance results are shown in FIGS. 5A through 5C. The computation penalty is linear as the number of samples is increased.

To reduce the number of samples needed while maintaining consistent results, embodiments of the matting technique may importance sample, instead of random sample, the colors within the selected region. To determine which colors best represent the samples, at least some embodiments may use a K-means clustering technique to quantize the image. K-means may be used, for example, because other quantization schemes such as uniform quantization may introduce dithered results, creating unfavorable grouping of colors needed for the sampling. Moreover, using K-means, there is more color resolution in groups within commonly appearing colors. This may provide an advantage of distinguishing colors that are very similar. However, other methods than K-means may be used in some embodiments.

In the K-means technique, the user-selected region C contains clusters G, which is a subset of all clusters within the image. For each cluster in G, at least some embodiments may compute the number of occurrences, N, of the cluster within the selected region. For each $G_i$, a weight may be computed:

$$W(G_i) = N_i \bigg/ \sum_{j=0}^{n} N_j \quad (3)$$

where n is the number of unique clusters within the selected region. At least some embodiments may then sample the pixels based on the weights. Effectively, all pixel colors that appear in the selection will be accounted for, which helps reduce the number of samples required to capture the importance colors needed. This technique may reduce the inconsistent output generated by a small number of samples that may occur using random sampling.

Locality Constraint with Texture Analysis

A goal of the locality constraint component of the matting technique is to provide a locality constraint on the mask that was computed by the color constraint component according to a radial basis function technique as described above.

The flood fill algorithm is an iterative algorithm that expands on the user-selected area. However, there are limitations to conventional flood fill algorithms. For example, flood fill performs well in relatively low-textured regions, but because of its neighbor comparisons flood fill may perform poorly in relatively high-textured regions. Another limitation of flood fill lies in its binary nature. In areas of gradients, e.g. clouds, skies, and bokeh, flood fill may create binary discontinuities that may result in seams in the images. (Bokeh refers to a subjective quality of out-of-focus areas of a photographic image.) At least some embodiments may leverage the properties of the flood fill algorithm for obtaining a fast locality constraint, while employing texture reduction and adaptive feathering to address the limitations of conventional flood fill techniques.

Some embodiments may use 10 percent of the color space range as a parameter for flood fill tolerance. However, other values or parameters may be used in other embodiments.

At least some embodiments may segment out a textured area using a flood fill algorithm. Color-based selection may perform well in low-textured regions, but tends to perform poorly in high-textured regions. Therefore, to preserve the hard edges and reduce the effects from texture, embodiments may apply an edge-preserving filter to the image. Edge-preserving filters smooth out mid-frequency and low-frequency regions (texture) while maintaining high frequency regions (hard edges). In at least some embodiments, a color-based bilateral filter may be used to remove texture and noise. Given an input image I and an output image of Î, the formulation may be expressed as:

$$W(X_q) = \exp\left(-\frac{|X_p - X_q|^2}{2\sigma_{spatial}^2} - \frac{|I(X_p) - I(X_q)|^2}{2\sigma_{color}^2}\right) \quad (4)$$

$$I(X_p) = \frac{\sum_{q \in N} I(X_q) W(X_q)}{\sum_{q \in N} W(X_q)}$$

where N is an n×n neighborhood around pixel p, and $X_p$ and $X_q$ represent the pixel location vector <x, y>.

However, because of its texture and locality weighting terms, the bilateral filter may be inefficient. Thus, in at least some embodiments, an approximation of the bilateral filter using histograms may be used. The histogram method may reduce computation by reducing the locality term, and performs the filtering in constant time relative to the size of the filter. At least some embodiments may use a large filter size for a more effective texture reduction. To further reduce impacts of shadows and dark regions, at least some embodiments may use only the hue channel of the bilateral filter output in the flood fill algorithm.

In at least some embodiments, the parameters used for the bilateral filter are radius=60 and $\sigma_{color}^2=0.02$, assuming a color channels range of [0.0, 1.0]. However, other values may be used in some embodiments.

Figure 7B:
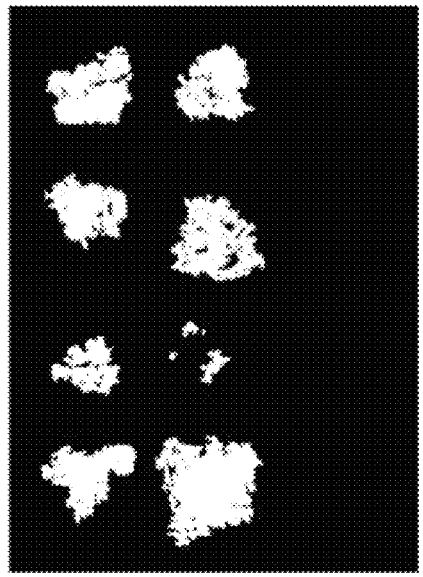
FIGS. 7A through 7D illustrate texture reduction, according to at least some embodiments.
Figure 7D:
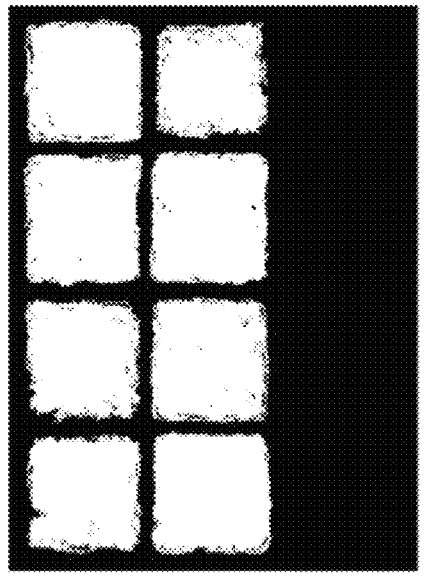
Figure 7A:
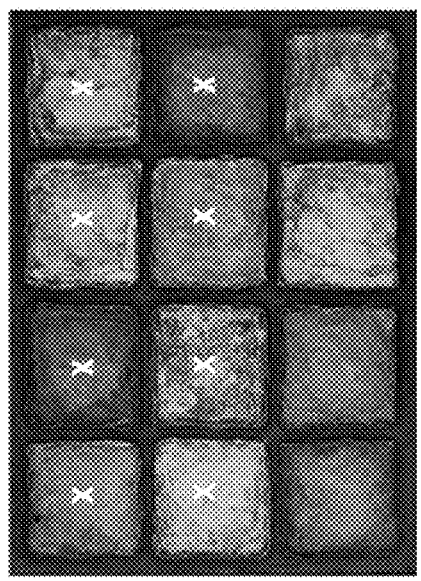
Figure 7C:
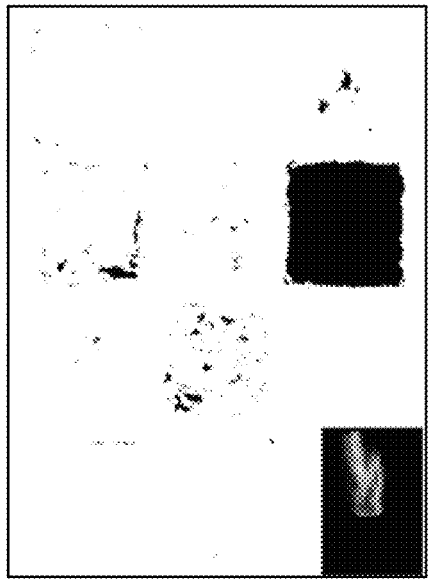

FIGS. 7A through 7D illustrate texture reduction, according to at least some embodiments. Eight tiles are selected (as indicated by the white x's) in the original input image shown in FIG. 7A. Without texture reduction, flood fill algorithms perform poorly in textured regions. The user has to modify the tolerance parameters for the flood fill, which generates a wide range of results (FIGS. 7B and 7C). FIG. 7B shows results at 15% tolerance, and FIG. 7C shows results at 99% tolerance. However, using texture reduction through the bilaterally filtered hue channel as described herein, embodiments may select the tiles more appropriately, as shown in FIG. 7D.

Using the hue channel of the bilateral filtered image, embodiments may compute a locality mask using a flood fill neighbor expansion. In at least some embodiments, to determine areas where there are textured and untextured regions, for each pixel at the edge of the selection, the matting technique may determine if the original image's corresponding pixel is in a high or low frequency region (see FIG. 8).

Figure 8:
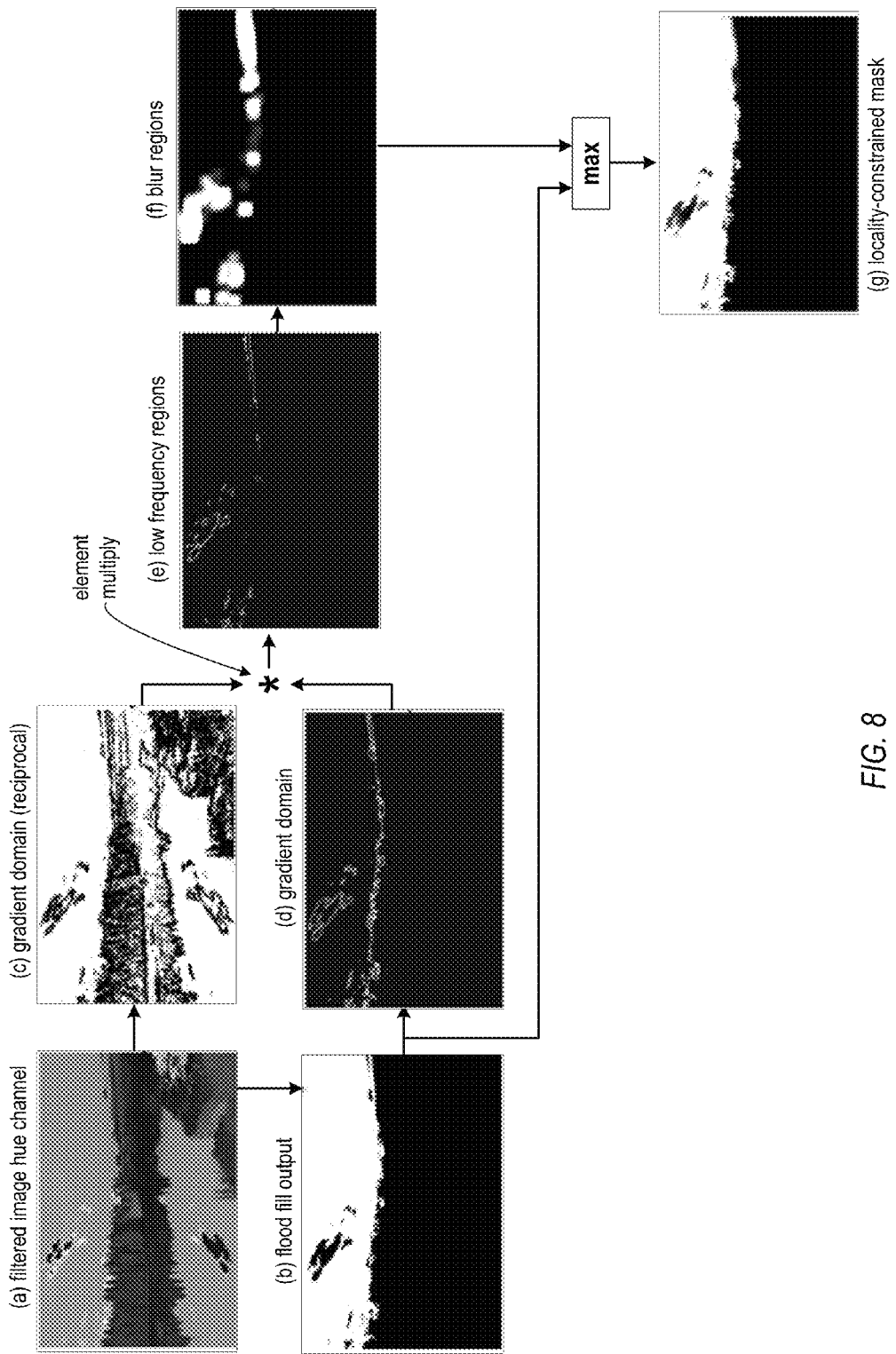
FIG. 8 illustrates a locality constraint component pipeline that performs a texture analysis technique to generate a locality-constrained mask, according to at least some embodiments.

FIG. 8 illustrates a locality constraint component pipeline that performs a texture analysis technique to generate a locality-constrained mask, according to at least some embodiments. A motivation is to feather regions in low frequency regions to prevent edge seams, and to prevent feathering in high frequency regions to prevent unwanted halos. With the edge-preserving (e.g., bilateral) filtered image hue (a) and the flood fill output (b) as input, embodiments may analyze the textures of (a) and (b) in the gradient domain (c) and (d). Embodiments may then use the gradient outputs to determine which boundary regions (edges) of the selection are in low frequency regions (e) of a selection region indicated by the flood fill mask (b). For selections (edges) determined to be in the low frequency regions, embodiments may perform a selective blur to generate blur regions (f). The selective blur softens the edges of the mask output and results in smoothed selections in the low frequency regions (FIG. 8 (d)) while maintaining hard edges in high frequency regions when blended with the flood fill output (b) to generate the locality-constrained mask (g). In at least some embodiments, a MAX operation may be used to blend the blur output (f), in which the maximum value from either the blur output (f) or the flood fill output (b) is used in the mask (g).

In FIG. 8, in at least some embodiments, a gradient domain technique that uses a neighborhood region to determine the average of high gradient values may be used to perform the selective blur. The method may take the absolute sum of the vertical and horizontal gradient of both the hue channel of the bilateral filtered image (FIG. 8(a)) and the flood fill output (FIG. 8(b)). The regions where the bilateral hue channel gradient is less than $\alpha$ and the flood fill output mask gradient is greater than 0 may be blurred. The bilateral hue channel gradient determines the low frequency regions, while the flood fill output mask gradient determines where the selection edges are. For those pixels in low frequency regions (FIG. 8(d)), at least some embodiments may apply a simple Gaussian smoothing to the mask to generate blur regions (e). Blending blur regions (e) with flood fill output (b) results in a mask (g) that is smooth in low frequency regions while maintaining the favorable hard edges in high frequency regions.

In at least some embodiments, $\alpha=0.05$ and the Gaussian $\sigma=15$ pixels with radius of 50 pixels may be used. However, other values may be used in other embodiments. In at least some embodiments, the user may choose a smooth fall-off in the radius sizes; however, in other embodiments, this may be kept constant for efficiency. Note that this technique may be faster than conventional implementations of adaptive feathering techniques (see FIGS. 9A-9C).

Figure 9A:
FIGS. 9A through 9C illustrate adaptive feathering.
Figure 9B:
Figure 9C:

FIGS. 9A through 9C illustrate adaptive feathering, according to at least some embodiments. Each Figure shows an output image, and a matte used to produce the image indicated by the dotted rectangle in the lower left corner of the image. In a conventional flood fill technique (FIG. 9A), seams may be seen in the sky resulting from flood fill's binary selection. Using the same parameters, results of an embodiment of the matting technique (FIG. 9C) are compared to results of a conventional "smart radius" feathering technique (FIG. 9B). The feathering in FIG. 9C shows smoother fall-offs and provides more flexibility with the color constraint in terms of color selection than the results of the conventional technique shown in FIG. 9B. Furthermore, to achieve the results in FIG. 9B, the conventional technique may take several times longer than it takes an embodiment of the matting technique to achieve the results in FIG. 9C.

In at least some embodiments, to blend the outputs of the locality constraint component and the color constraint component of the matting technique as described herein, the two masks output by the two components (see FIG. 4) may be element multiplied to obtain the final output mask. This final mask respects both locality and color similarities. Note that other techniques may be used to combine the two masks in some embodiments.

Importance Sampling Validation

This section demonstrates the effectiveness of importance sampling. (Results are shown in FIGS. 6A and 6B, which were previously discussed.) A measurement is performed that checks the consistency of the output and checks for convergence of the RBF output. The matte value from the radial basis function is examined and the following is computed:

$$V(M(i)) = \operatorname{Var}\left(\sum_{j=1}^{10} M_j(i)\right)$$

$$\overline{V} = \sum_{i \in I} V(M(X_i))/(\operatorname{width}(I) * \operatorname{height}(I))$$

where $\overline{V}$ is the average variance of all pixels, I is the matte of size width and height, M is the matte value, i is the pixel index, and j is the iteration count. Ten iterations may be used for all sample counts. From the graphs shown in FIGS. 6A and 6B, it can be seen that using importance sampling produces more consistent results due to its low variance in the matte output values.

Matting Technique Validation

Several different selections were performed with over 120 diverse and realistic examples. To validate the results, the output of an embodiment of the matting technique described herein was compared with results of conventional matting techniques. In general, results of the matting technique show smoother fall-offs in low-frequency regions than conventional techniques, and the matting technique performs segmentation well in many scenarios. Moreover, the matting technique shows a time performance advantage over the conventional techniques. Because the matting technique reduces the number of strokes needed, reduces computational time, and provides favorable output mattes, embodiments of the matting technique may be suitable for applications on lower-powered devices such as mobile devices and touch-enabled devices (e.g., mobile phones, smartphones, tablet devices, pad devices, digital cameras, etc.), as well as for matting applications in digital image processing applications on more powerful devices such as laptop, notebook, and desktop computers.

Figure 10C:
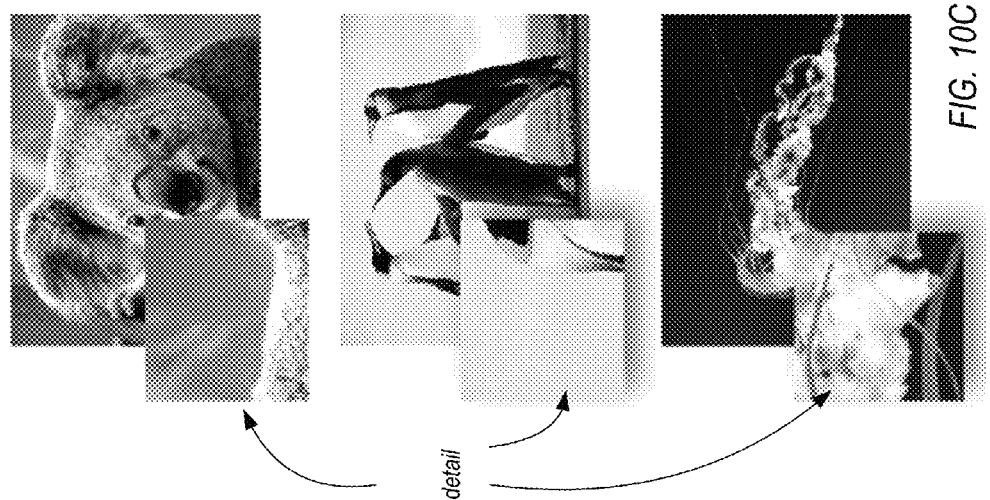
FIGS. 10A through 10C compare results of embodiments of the matting technique described herein to results of conventional matting techniques.
Figure 10B:
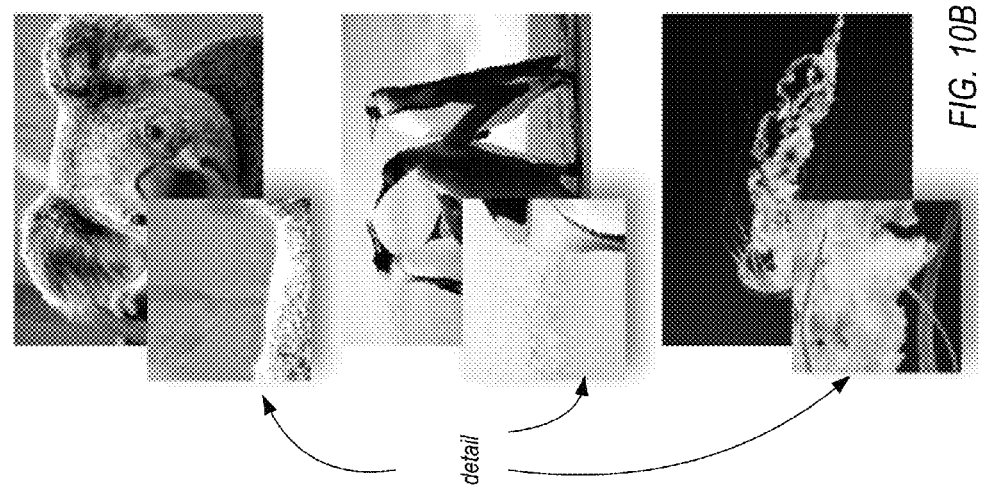
Figure 10A:
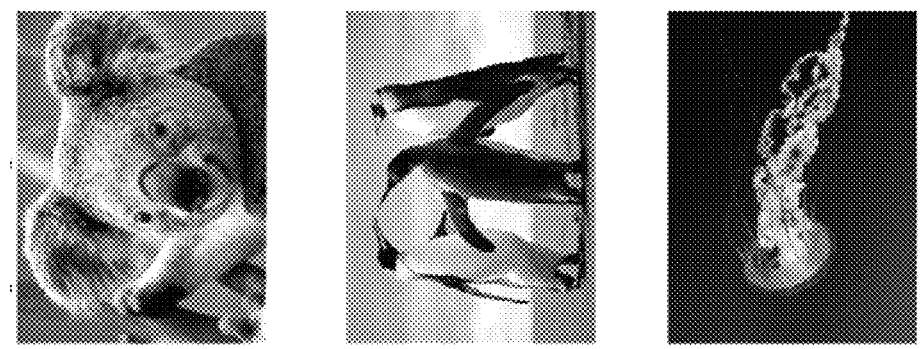

FIGS. 10A through 10C illustrate some advantages of embodiments of the matting technique described herein when compared to conventional matting techniques. In particular, FIGS. 10B and 10C compare desaturation between conventional Gaussian techniques (FIG. 10B) and an embodiment of the matting technique described herein (FIG. 10C) applied to three original images (FIG. 10A). It can be seen in FIG. 10C that embodiments of the matting technique may provide smoother results and minimize the visible artifacts in matting when compared to the results of the conventional technique as shown in FIG. 10B.

Figure 11A:
Figure 11B:

As with other color-based techniques, embodiments of the matting technique may exhibit inaccurate selections in regions where colors are very similar. FIG. 11A shows an input image and a selection region, and FIG. 11B illustrates an over-selected result image. In FIGS. 11A and 11B, it can be seen that the bokeh of the leaves blends with the deer in the center. The color similarity causes an over-selection throughout the image (FIG. 11B). Regions with similar colors such as the out-of-focus leaves on the deer's body can thus skew the results, and the output becomes over-selected. Some embodiments may utilize different spaces instead of or in addition to color space to help overcome this problem. Color space shows limitations in color-similarity, as noted above in reference to FIGS. 11A and 11B. In some embodiments, texture-based metrics may be used instead of or in addition to color space metrics to provide better performance where there are different textures with similar colors.

Fast Adaptive Edge-aware Matting Technique Flowchart

FIG. 12 is a more detailed flowchart of a fast adaptive edge-aware matting technique as described above, according to at least some embodiments. As indicated at 300, an image and a specified region of the image may be obtained. The specified region indicates a color selection to be used in generating a mask for the image. The specified region may, for example, be specified by one or more user interactions (e.g., strokes) applied to the displayed image via a user interface.

Elements 302 through 308 illustrate a color similarity constraint technique, and expand on element 102 of FIG. 3. As indicated at 302, color clustering may be performed to determine a dominant color for the image. In at least some embodiments, a K-means technique may be used to perform color clustering. As indicated at 304, a set of samples may be generated according to an importance sampling technique that weights selection of samples towards areas in the image that include the dominant color. As indicated at 306, a radial basis function may be generated according to the generated set of samples. As indicated at 308, a color constraint mask may be computed for the image according to the radial basis function. In at least some embodiments, computing the color constraint mask may involve computing a value at each pixel location of the color constraint mask according to the radial basis function.

Elements 310 through 318 illustrate a locality constraint technique, and expand on element 104 of FIG. 3. As indicated at 310, an edge-preserving filter may be applied to the image to generate a filtered image. In at least some embodiments, a bilateral filter may be used. As indicated at 312, a flood fill mask may be generated from the hue channel of the filtered image according to a flood fill technique. The flood fill mask indicates edges in the image and a selection region of the image. As indicated at 314, edges may be determined in the selection region that correspond to low frequency regions of the image according to a frequency analysis technique. In at least some embodiments, to determine the edges in the selection region, a gradient domain mask may be generated for the flood fill mask. Another gradient domain mask may be generated from the hue channel of the filtered image. The gradient domain masks may then be blended (e.g., according to an element multiply operation) to generate a mask indicating the edges in the selection region corresponding to the low frequency regions of the image. As indicated at 316, the edges in the selection region may be blurred according to a blur technique to generate a blur mask indicating one or more blur regions in the image in which edges are to be smoothed. As indicated at 318, the flood fill mask and the blur mask may be blended to generate the locality constraint mask for the image. In at least some embodiments, to blend the flood fill mask and the blur mask, each pixel in the locality constraint mask may be assigning a value according to a maximum of the values at the corresponding pixel location in the flood fill mask and the blur mask. The texture analysis that is performed by elements 310 through 318 generates a locality constraint mask for the image that has smoothed selections in regions corresponding to low frequency regions of the image while maintaining edges in regions corresponding to high frequency regions of the image.

As indicated at 320, the color constraint mask and the locality constraint mask may be blended to generate an output mask for the image. In at least some embodiments, the color constraint mask and the locality constraint mask may be blended by performing an element multiply of values at corresponding pixels in the color constraint mask and the locality constraint mask to generate values for respective pixels in the output mask.

Example Implementations

Some embodiments may include a means for fast adaptive edge-aware matting as described herein. For example, a matting module may implement an embodiment of the matting technique as described herein. The matting module receives an image and a user selection as input, generates a color constraint mask according to a color constraint component based on a radial basis function technique, generates a locality constraint mask according to a color constraint component based on a fast flood fill technique, and combines the two outputs to generate an output mask, as described herein. The matting module may in some embodiments be implemented by a non-transitory, computer-readable storage medium and one or more processors (e.g., CPUs and/or GPUs) of a computing apparatus. The computer-readable storage medium may store program instructions executable by the one or more processors to cause the computing apparatus to perform receiving an image and a user selection as input, generating a color constraint mask according to a color constraint technique based on a radial basis function technique, generating a locality constraint mask according to a locality constraint technique based on a fast flood fill technique, and combining the two outputs to generate an output mask, as described herein. Other embodiments of the matting module may be at least partially implemented by hardware circuitry and/or firmware stored, for example, in a non-volatile memory.

While embodiments of the color constraint component and the locality constraint component are described herein as being implemented together in a matting pipeline (FIG. 4) or module (FIG. 13), note that each of these components may be separately implemented in other image processing applications or techniques.

Figure 13:
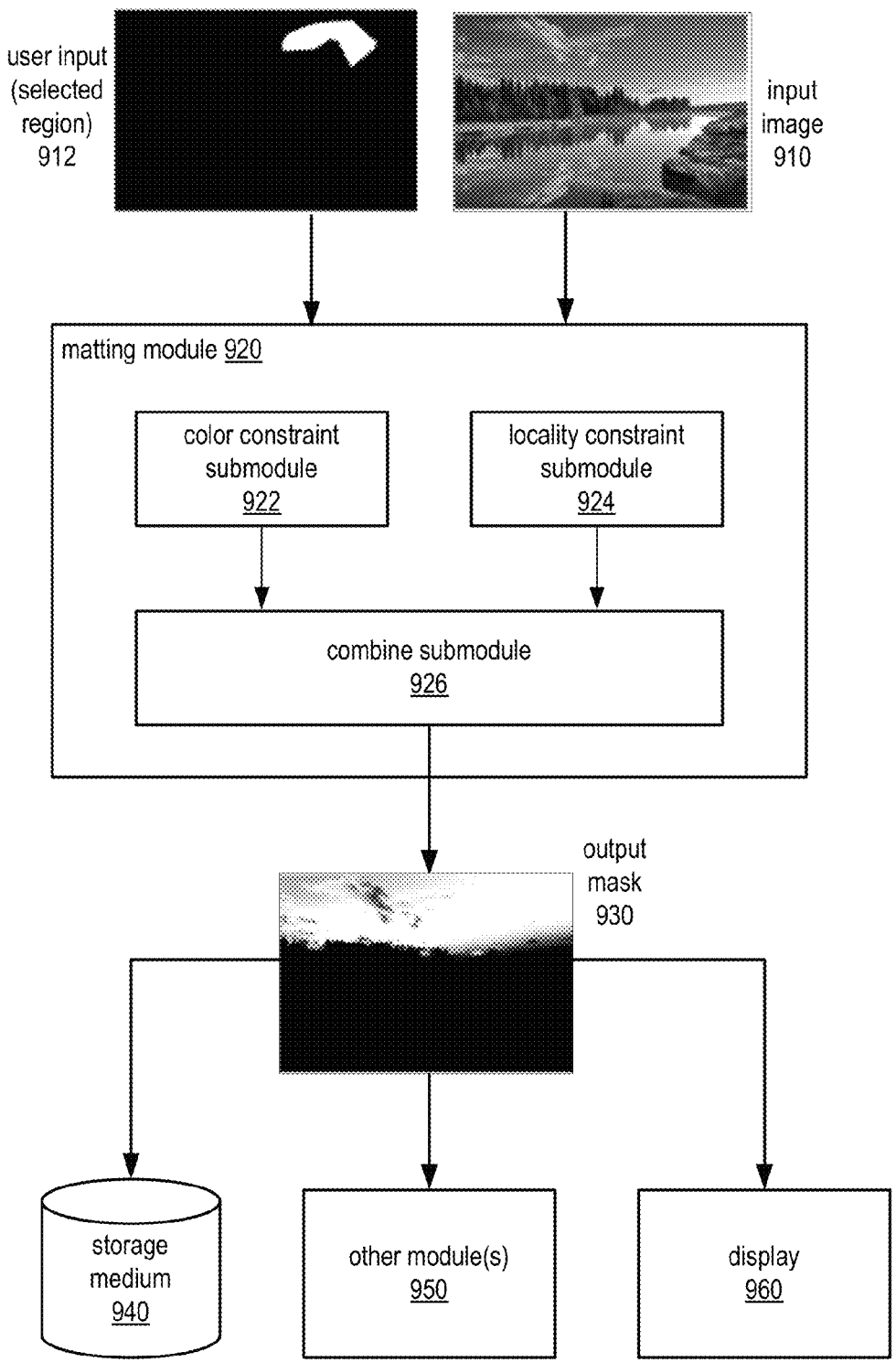
FIG. 13 illustrates a module that may implement a matting technique, according to at least some embodiments.
Figure 14:
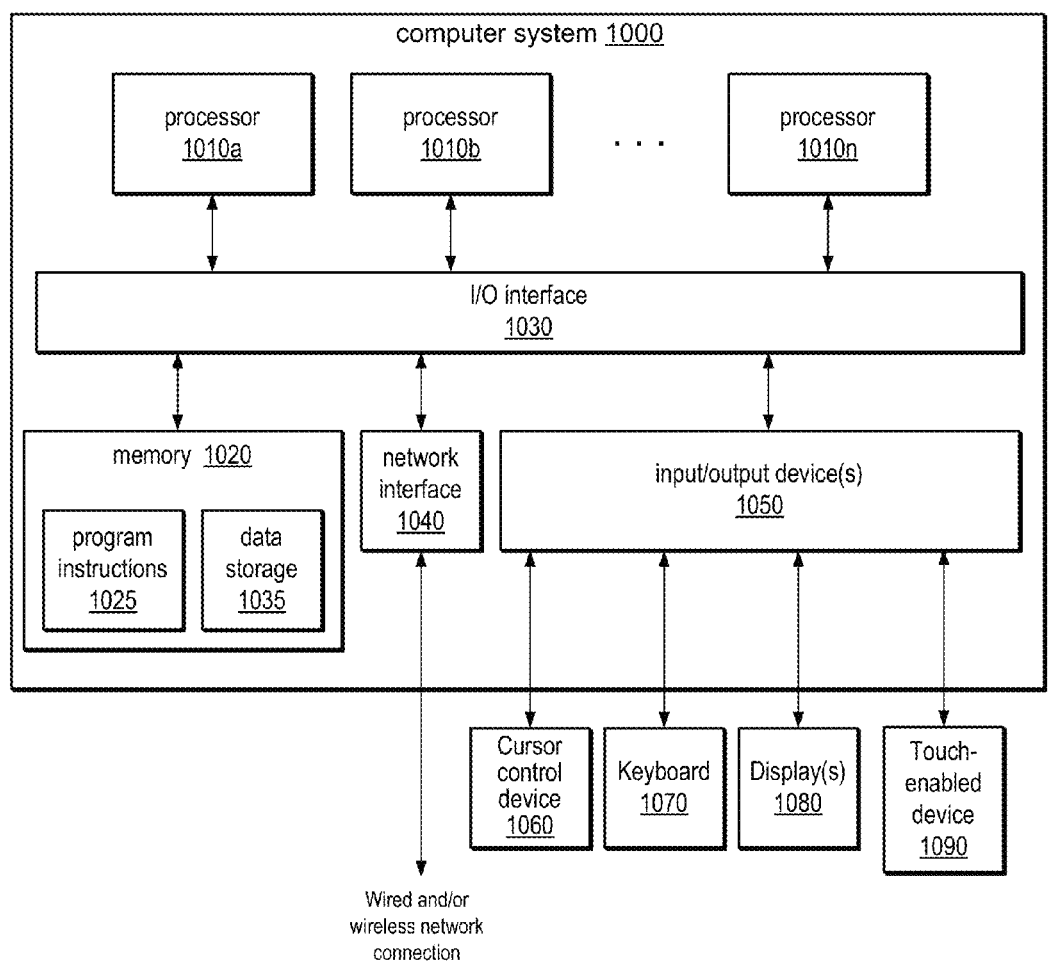
FIG. 14 illustrates an example computer system that may be used in embodiments.

FIG. 13 illustrates a matting module that may implement a matting technique, for example as illustrated in FIGS. 3, 4, 8, and/or 12. Matting module 920 may, for example, implement a color constraint submodule 922 that implements generating a color similarity constraint based on a radial basis function technique, a locality constraint submodule 924 that implements generating a locality constraint based on a fast flood fill technique, and a combine submodule 926 that combines the outputs of submodules 922 and 924 to generate an output mask 930. Module 920 receives as input an image 910 and user input indicating a selected region 912. Color constraint submodule 922 generates a color similarity constraint based on a radial basis function technique. Locality constraint submodule 924 generates a locality constraint based on a fast flood fill technique. The outputs of 922 and 924 are combined by submodule 925 to generate an output mask 930. Output mask 930 may, for example, be stored to a storage medium 940, such as system memory, a disk drive, DVD, CD, etc., displayed on a display 960, and/or passed to one or more other modules 950 where the output mask 930 may be used in various image processing functions. FIG. 14 illustrates an example computer system on which embodiments of matting module 920 may be implemented.

Example System

Embodiments of the matting module and/or of the matting technique as described herein may be executed on one or more computer systems, which may interact with various other devices. One such computer system is illustrated by FIG. 14. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a tablet or pad device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, display(s) 1080, and touch-enabled device 1090. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, the image processing methods disclosed herein may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described above for embodiments of the matting module and/or of the matting technique as described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

As shown in FIG. 14, memory 1020 may include program instructions 1025, configured to implement embodiments of the matting module and/or of the matting technique as described herein, and data storage 1035, comprising various data accessible by program instructions 1025. In one embodiment, program instructions 1025 may include software elements of embodiments of the matting module and/or of the matting technique as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the matting module and/or of the matting technique as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, smartphones, pad or tablet devices, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Conclusion

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A method, comprising:
performing, by one or more computing devices:
obtaining an image and a specified region of the image that indicates a color selection to be used in generating a mask for the image;
generating a color constraint mask for the image by:
generating a set of samples according to an importance sampling technique that weights selection of samples towards areas in the image that include a dominant color of the specified region;
generating a radial basis function according to the generated set of samples; and
computing a value at each pixel location of the color constraint mask according to the radial basis function;
performing a texture analysis on the image to generate a locality constraint mask for the image that produces smoothed selections in regions of the locality constraint mask corresponding to low frequency regions of the image while maintaining edges in regions of the locality constraint mask corresponding to high frequency regions of the image; and
blending the color constraint mask and the locality constraint mask to generate an output mask for the image.

2. The method as recited in claim 1, further comprising, prior to said generating a set of samples according to an importance sampling technique:
  applying a color clustering technique to the image to generate color clustering information for the image; and
  determining the dominant color of the specified region according to the color clustering information.

3. The method as recited in claim 2, wherein the color clustering technique is a K-means technique.

4. The method as recited in claim 1, wherein said performing a texture analysis on the image to generate a locality constraint mask for the image comprises:
  generating a flood fill mask for the image according to a flood fill technique, wherein the flood fill mask indicates edges in the image and a selection region of the image;
  determining edges in the selection region corresponding to low frequency regions of the image according to a frequency analysis technique;
  blurring the edges in the selection region according to a blur technique to generate a blur mask indicating one or more blur regions in the image in which edges are to be smoothed; and
  blending the flood fill mask and the blur mask to generate the locality constraint mask for the image.

5. The method as recited in claim 4, further comprising applying an edge-preserving filter to the image to generate a filtered image, wherein the flood fill technique is applied to a hue channel of the filtered image to generate the flood fill mask.

6. The method as recited in claim 4, wherein said determining edges in the selection region corresponding to low frequency regions of the image according to a frequency analysis technique comprises:
  generating a gradient domain mask for the flood fill mask;
  generating a gradient domain mask for the image; and
  blending the gradient domain mask for the flood fill mask and the gradient domain mask for the image to generate a mask indicating the edges in the selection region corresponding to the low frequency regions of the image.

7. The method as recited in claim 6, further comprising applying an edge-preserving filter to the image to generate a filtered image, wherein the gradient domain mask for the image is generated from a hue channel of the filtered image.

8. The method as recited in claim 4, wherein said blending the flood fill mask and the blur mask to generate the locality constraint mask for the image comprises, for each pixel in the locality constraint mask, assigning a value to the pixel according to a maximum of values at corresponding pixel locations in the flood fill mask and the blur mask.

9. The method as recited in claim 1, wherein said blending the color constraint mask and the locality constraint mask to generate an output mask for the image comprises performing an element multiply of values at corresponding pixels in the color constraint mask and the locality constraint mask to generate values for respective pixels in the output mask.

10. A system, comprising:
  at least one processor; and
  a memory comprising program instructions, wherein the program instructions are executable by the at least one processor to:
    obtain an image and a specified region of the image that indicates a color selection to be used in generating a mask for the image;
    generate a color constraint mask for the image by:
      generating a set of samples according to an importance sampling technique that weights selection of samples towards areas in the image that include a dominant color of the specified region;
      generating a radial basis function according to the generated set of samples; and
      compute a value at each pixel location of the color constraint mask according to the radial basis function;
    perform a texture analysis on the image to generate a locality constraint mask for the image that produces smoothed selections in regions of the locality constraint mask corresponding to low frequency regions of the image while maintaining edges in regions of the locality constraint mask corresponding to high frequency regions of the image; and
    blend the color constraint mask and the locality constraint mask to generate an output mask for the image.

11. The system as recited in claim 10, wherein the program instructions are further executable by the at least one processor to, prior to said generating a set of samples according to an importance sampling technique:
  apply a color clustering technique to the image to generate color clustering information for the image; and
  determine the dominant color of the specified region according to the color clustering information.

12. The system as recited in claim 10, wherein, to perform a texture analysis on the image to generate a locality constraint mask for the image, the program instructions are executable by the at least one processor to:
  apply an edge-preserving filter to the image to generate a filtered image;
  generate a flood fill mask for the image according to a flood fill technique applied to a hue channel of the filtered image, wherein the flood fill mask indicates edges in the image and a selection region of the image;
  determine edges in the selection region corresponding to low frequency regions of the image according to a frequency analysis technique;
  blur the edges in the selection region according to a blur technique to generate a blur mask indicating one or more blur regions in the image in which edges are to be smoothed; and
  blend the flood fill mask and the blur mask to generate the locality constraint mask for the image.

13. The system as recited in claim 12, wherein, to determine edges in the selection region corresponding to low frequency regions of the image according to a frequency analysis technique, the program instructions are executable by the at least one processor to:
  generate a gradient domain mask for the flood fill mask;
  generate a gradient domain mask for the hue channel of the filtered image; and
  blend the gradient domain mask for the flood fill mask and the gradient domain mask for the hue channel of the filtered image to generate a mask indicating the edges in the selection region corresponding to the low frequency regions of the image.

14. A non-transitory computer-readable storage medium storing program instructions that are computer-executable to implement a masking module configured to:
  obtain an image and a specified region of the image that indicates a color selection to be used in generating a mask for the image;
  generate a color constraint mask for the image by:
    generating a set of samples according to an importance sampling technique that weights selection of samples towards areas in the image that include a dominant color of the selected region;

generating a radial basis function according to the generated set of samples; and computing a value at each pixel location of the color constraint mask according to the radial basis function;

perform a texture analysis on the image to generate a locality constraint mask for the image that produces smoothed selections in regions of the locality constraint mask corresponding to low frequency regions of the image while maintaining edges in regions of the locality constraint mask corresponding to high frequency regions of the image; and blend the color constraint mask and the locality constraint mask to generate an output mask for the image.

15. The non-transitory computer-readable storage medium as recited in claim 14, wherein the masking module is further operable to, prior to said generating a set of samples according to an importance sampling technique:

apply a color clustering technique to the image to generate color clustering information for the image; and determine the dominant color of the specified region according to the color clustering information.

16. The non-transitory computer-readable storage medium as recited in claim 14, wherein, to perform a texture analysis on the image to generate a locality constraint mask for the image, the masking module is configured to:

apply an edge-preserving filter to the image to generate a filtered image;

generate a flood fill mask for the image according to a flood fill technique applied to a hue channel of the filtered image, wherein the flood fill mask indicates edges in the image and a selection region of the image;

determine edges in the selection region corresponding to low frequency regions of the image according to a frequency analysis technique;

blur the edges in the selection region according to a blur technique to generate a blur mask indicating one or more blur regions in the image in which edges are to be smoothed; and blend the flood fill mask and the blur mask to generate the locality constraint mask for the image.

17. The non-transitory computer-readable storage medium as recited in claim 16, wherein, to determine edges in the selection region corresponding to low frequency regions of the image according to a frequency analysis technique, the masking module is configured to:

generate a gradient domain mask for the flood fill mask;

generate a gradient domain mask for the hue channel of the filtered image; and blend the gradient domain mask for the flood fill mask and the gradient domain mask for the hue channel of the filtered image to generate a mask indicating the edges in the selection region corresponding to the low frequency regions of the image.

18. The non-transitory computer-readable storage medium of claim 15, wherein the color clustering technique is a K-means technique.

19. The non-transitory computer-readable storage medium as recited in claim 16, wherein generating the locality constraint mask for the image comprises assigning a value to each pixel in the locality constraint mask according to a maximum of values at corresponding pixel locations in the flood fill mask and the blur mask.

20. The system as recited in claim 11, wherein the color clustering technique is a K-means technique.

\* \* \* \* \*